UNITED STATES PATENT OFFICE.

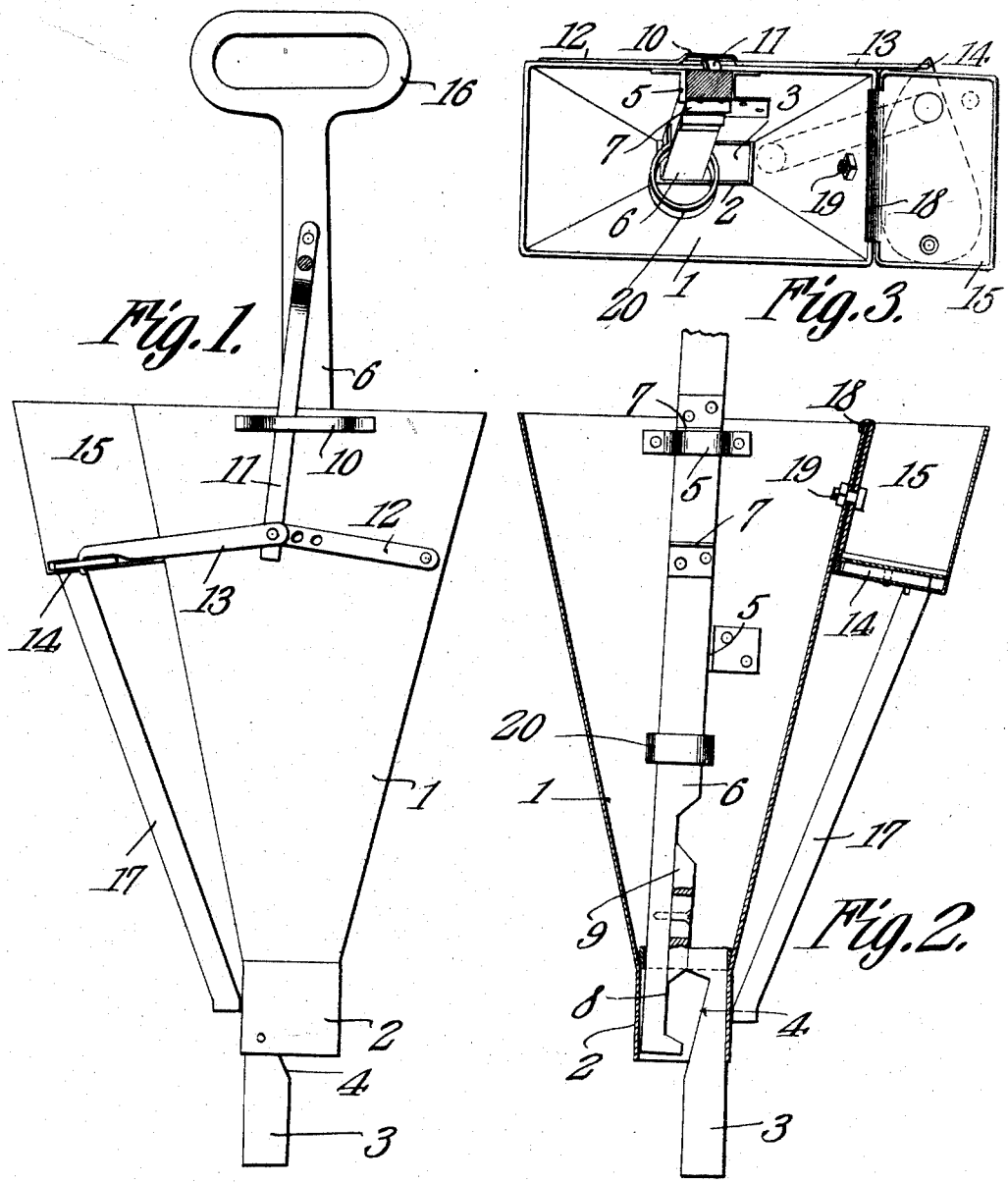

LUTHER B. THOMAS, OF RINGGOLD, LOUISIANA.

FERTILIZER DROPPER AND PLANTER.

No. 927,084.           Specification of Letters Patent.           Patented July 6, 1909.

Application filed March 24, 1909. Serial No. 485,444.

*To all whom it may concern:*

Be it known that I, LUTHER B. THOMAS, a citizen of the United States, residing at Ringgold, in the parish of Beinville and State of Louisiana, have invented a new and useful Fertilizer Dropper and Planter, of which the following is a specification.

This invention has relation to hand fertilizers, droppers and planters, and it consists in the novel construction and arrangement of its parts, as hereinafter shown and described.

The object of the invention is to provide a simple and an effective hand implement adapted to be carried from place to place, and to be readily operated for the purpose of depositing fertilizer in the soil, and, at the same time, dropping seed, such as corn or beans adjacent the hill or deposit of fertilizer.

The implement consists of a hopper having in its lower end a notched block with a projecting end portion, and a valve slidably mounted therein and adapted to coöperate with the notched end portion of the said block for the purpose of liberating the fertilizer. A receptacle for the seed is detachably mounted upon the hopper and is provided with a seed cut-off which is operatively connected with the valve mounted in the hopper.

In the accompanying drawings:—Figure 1 is a side elevation of the dropper and planter. Fig. 2 is a vertical sectional view of the same. Fig. 3 is a top plan view of the same.

The combined fertilizer, dropper and planter consists of a hopper 1, which is preferably of cuniform configuration, and which is provided at its lower end with a depending sleeve 2. A block 3 is located in the said sleeve, and the lower end of the said block projects beyond the lower end of the sleeve. The block 3 is provided in its edge located within the said sleeve with a notch 4. Guides 5 are located upon the inner side of one of the walls of the hopper 1, and a valve 6 is slidably mounted in the said guides. Stops 7 are mounted upon the inner side of the valve 6 and are adapted to engage the upper and lower edges of the guides 5 and limit the longitudinal movement of the said valve. The lower portion of the valve 6 is recessed as at 8, and in the said recess is located an adjustable block 9. The lower portion of the recess 8 is adapted to coöperate with the notch 4 provided in the block 3 for measuring the quantity of fertilizer to be dropped by the implement. A guide 10 is located upon the exterior side of one of the walls of the hopper 1. A link 11 is pivotally attached at its upper end to the upper portion of the stem of the valve 6, and the lower portion of the said link passes transversely through the guide 10, and to the lower end of the link 11 is adjustably and pivotally secured the inner ends of links 12 and 13. The outer end of the link 12 is pivotally attached to one of the sides of the hopper 1, and the outer end of the link 13 is pivotally attached to a cut-off valve 14, which is pivotally mounted in the bottom of the seed receptacle 15. The upper end of the stem of the valve 6 is provided with a handle grip 16, and the seed receptacle 15 is provided with a discharge chute 17. The receptacle 15 is provided at the upper end portion of one of its sides with a flange 18, which is adapted to pass over the upper edge of one of the sides of the hopper 1, and said receptacle 15 is secured in position by means of a bolt 19, which passes transversely through the adjacent sides of the said receptacle and the said hopper.

From the above description it is obvious that as the combined implement is carried from place to place, an operator may project the lower end of the block 3 into the ground, which will carry with it the lower end portion of the sleeve 2. Then, by moving the valve 6 longitudinally in the guides 5, a quantity of fertilizer is pushed out through the notch 4 in the block 3 by the lower end portion of the said valve. Prior to this however, the block 9 in the recess 8 upon the lower portion of the valve is adjusted to properly regulate the quantity of fertilizer to be ejected at the lower end of the said hopper. At the same time that the stem of the valve 6 is moved vertically with relation to the hopper 1, the link 11 moves longitudinally, and the inner ends of the links 12 and 13 are swung down so that the said links 12 and 13 approach alinement with relation to each other. Inasmuch as the link 12 is pivotally mounted at one end to the side of the hopper 1 and the outer end of the link 13 is pivotally connected with the cut-off valve 14, the said valve 14 will be swung upon its pivot, and, during its movement, the said valve will receive a seed from the receptacle 15 and move the same over the upper end of the delivery chute 17, through which the said seed may fall to the ground. If, during the use of the implement, it is desired to deposit the fertilizer only, without dropping the seed as indicated, the seed receptacle 15 may be detached from the upper portion of the hopper 1 by removing the bolt 19 and disconnecting the outer end of the link 13 from the valve 14, located in the bottom of the receptacle 15. A stirrer or disintegrator 20 is attached to the valve 6 and is adapted to break the material contained within the hopper 1 as the valve 6 moves longitudinally.

Having described my invention, what I claim as new, and desire to secure, by Letters Patent, is:—

1. An implement as indicated comprising a hopper having a discharge outlet, a notched block located in the outlet of the hopper and projecting below the lower end thereof, a valve slidably mounted in the hopper and having a recess adapted to coöperate with the notch in the block to regulate the quantity of material dropped from the hopper.

2. A dropper comprising a hopper having a discharge outlet, a notched block located in the outlet of the hopper and having an end portion projecting below the lower end thereof, a valve slidably mounted in the hopper and having a recess adapted to coöperate with the notched block, and a block adjustably mounted in the recess of the valve.

3. A dropper comprising a hopper having a discharge outlet, a notched block located in the discharge outlet of the hopper and having a portion projecting below the lower end of the hopper, a valve slidably mounted in the hopper and having a recess adapted to coöperate with the notch in the block to regulate the amount of material dropped from the hopper, a seed receptacle attached to the hopper, a pivoted cut-off valve located in the seed receptacle, and means operatively connecting the cut-off valve in the seed receptacle with the valve in the hopper.

4. A dropper comprising a hopper having a discharge outlet, a block located in the outlet of the hopper and projecting below the lower end of the hopper, a valve slidably mounted in the hopper and having a recess adapted to coöperate with the notch in the block to regulate the quantity of material dropped from the hopper, a seed receptacle attached to the hopper and having a cut-off valve pivotally mounted therein, and a series of links pivotally connected together at their inner ends and operatively connecting the valve in the hopper with the valve in the seed receptacle.

In testimony that I claim the foregoing as my own, I have hereto affixed my signature in the presence of two witnesses.

LUTHER B. THOMAS.

Witnesses:
C. F. THOMAS,
D. K. THOMAS.